United States Patent
Wada et al.

(10) Patent No.: US 7,333,299 B2
(45) Date of Patent: Feb. 19, 2008

(54) HEAD SUPPORTING MECHANISM INCLUDING TWO LOAD BEAMS WITH RIBS OVERLAPPED WITH EACH OTHER

(75) Inventors: Yoshimitsu Wada, Tokyo (JP); Takeshi Wada, Tokyo (JP); Takashi Honda, Tokyo (JP); Yoshihisa Higuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 422 days.

(21) Appl. No.: 10/997,857

(22) Filed: Nov. 29, 2004

(65) Prior Publication Data

US 2005/0128644 A1   Jun. 16, 2005

(30) Foreign Application Priority Data

Dec. 15, 2003   (JP) .............................. 2003-416132

(51) Int. Cl.
*G11B 5/55* (2006.01)

(52) U.S. Cl. ................ 360/294.7; 360/244.3; 360/244.5; 360/244.8; 360/244.9; 360/265.9; 360/266.1

(58) Field of Classification Search ............. 360/294.7, 360/244.5, 244.3, 244.8, 244.9, 265.9, 266.1
See application file for complete search history.

(56) References Cited

U.S. PATENT DOCUMENTS

| 6,751,064 B2 | 6/2004 | Kuwajima et al. |
| 7,218,479 B2 * | 5/2007 | Kuwajima et al. ....... 360/244.5 |

FOREIGN PATENT DOCUMENTS

| JP | 63-144474 | 6/1988 |
| JP | 9-82052 | 3/1997 |
| JP | 2004-303392 | 10/2004 |

* cited by examiner

*Primary Examiner*—A. J. Heinz
(74) *Attorney, Agent, or Firm*—Oblon, Spivak, McClelland, Maier & Neustadt, P.C.

(57) ABSTRACT

A suspension is provided, which comprises: a flexure with elasticity for supporting a head slider having at least one head element; a first load beam having first ribs for reinforcement at both side ends of the first load beam, for supporting the flexure; and a second load beam having second ribs for reinforcement at both side ends of the second load beam, at least a part of the second load beam being overlapped with the first load beam and being fixed to the first load beam, at least a part of the first and second ribs being overlapped with each other.

28 Claims, 8 Drawing Sheets

DIRECTION OF IMPACT APPLICATION

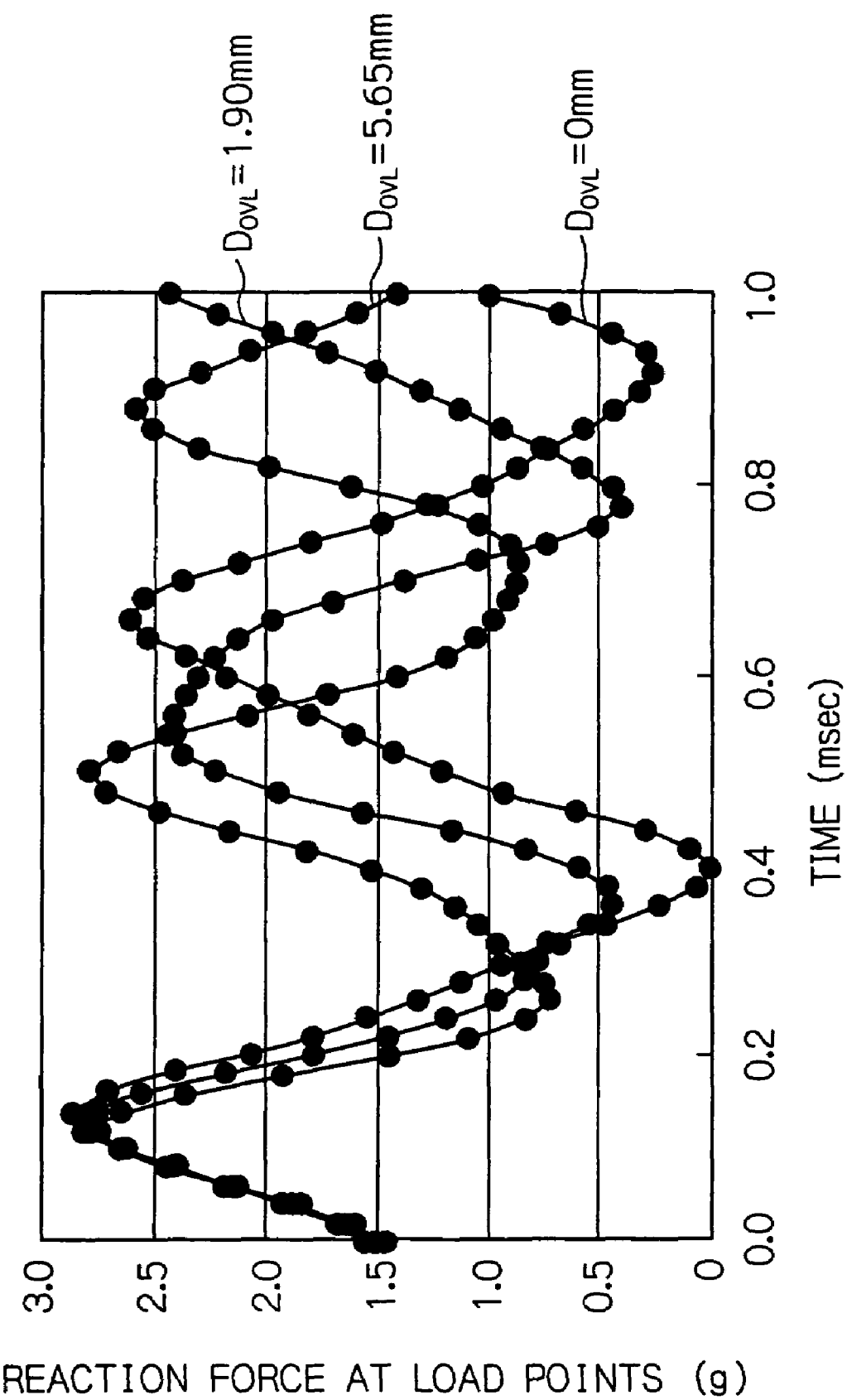

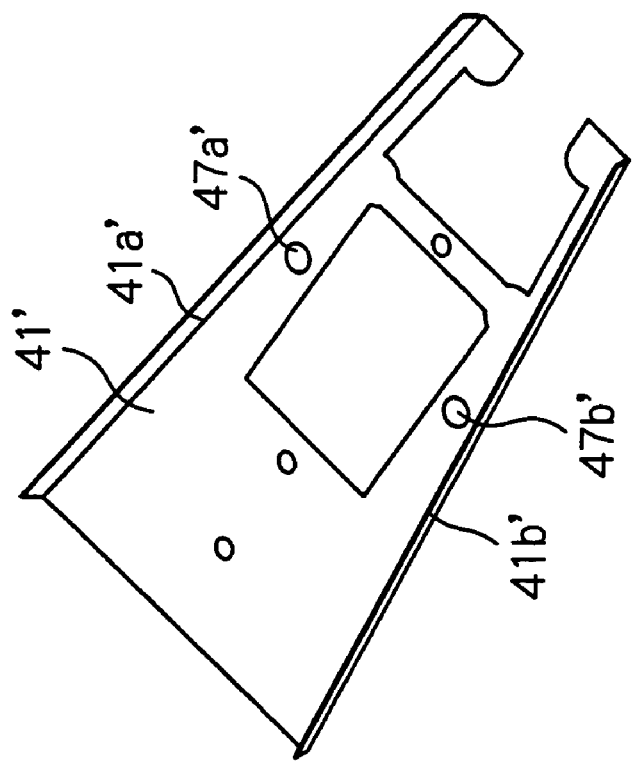
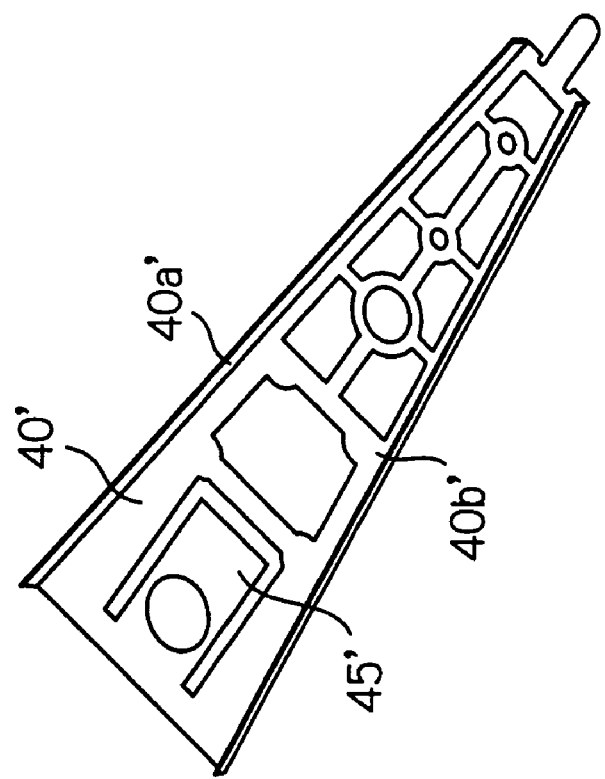
Fig. 10a
Fig. 10b

HEAD SUPPORTING MECHANISM INCLUDING TWO LOAD BEAMS WITH RIBS OVERLAPPED WITH EACH OTHER

PRIORITY CLAIM

This application claims priority from Japanese patent application No. 2003-416132, filed on Dec. 15, 2003, which is incorporated herein by reference.

BACKGROUND OF THE INVENTION

1. Field of the Invention

The present invention relates to a suspension, a head supporting mechanism having a combination of the suspension and a support arm, a head arm assembly (HAA) having the head supporting mechanism with a flying type head slider supporting a write and/or a read head element such as a thin-film magnetic head or an optical head, and a disk drive device with the HAA.

2. Description of the Related Art

In a magnetic disk drive device, a thin film magnetic head for writing magnetic information into and/or reading magnetic information from a magnetic disk is in general formed on a magnetic head slider flying in operation above the rotating magnetic disk. The magnetic head slider is fixed at a front end section of an HAA.

The HAA mainly includes a magnetic head slider, a flexure with elasticity supporting the magnetic head slider, a suspension having a load beam with elasticity supporting the flexure at a front end section of itself and a base plate supporting a rear end section of the load beam, and a support arm with high rigidity supporting the suspension. A load applied to the magnetic head slider in a direction to a magnetic disk surface is generated with a leaf spring set at some midpoint of the load beam in the suspension.

The conventional HAA as described above has a cantilever structure supporting the suspension at the rear end section of the structure. The cantilever structure has merits in a stabilization of a load applied to the magnetic head slider and a space saving, however it has a serious problem of a low impact-resistance. In other words, in the cantilever structure, because the magnetic head slider is mounted to a front end section without restraint, a torque applied by the magnetic head slider is added to a torque by the whole cantilever structure. The torque addition causes a slap mode that corresponds to popping-up from the magnetic disk surface or to beating it. Especially, the slap mode has a tendency to occur more often because the load beam, which is a lever structure supporting the magnetic head slider, is formed of a spring material with low rigidity (a stainless steel plate rather thicker than the flexure).

Almost no excessive impact is applied to a magnetic disk drive device with 3.5-inch disk mounted to a computer called high-end or desktop type. However, to a magnetic disk drive device with 2.5-inch disk mounted to a notebook computer, an excessive impact is likely to be applied, so the low impact-resistance becomes a serious problem.

In order to improve the impact-resistance of the HAA, an HAA with a new structure is proposed, where a magnetic head slider is mounted to one end section of an arm with high rigidity, while a coil part of a voice coil motor (VCM) for horizontal rotation is fixed to the other end section, and a balance structure is formed, which makes the arm rotatable in a radius direction of the magnetic disk around a bearing and rotatable in a orthogonal direction to a surface of the magnetic disk around the bearing, then a load is applied to the magnetic head slider by giving a leaf spring set at the bearing a force through a pivot. The proposed structure is described in, for example, U.S. Pat. No. 6,751,064.

According to such an HAA with the balance structure, in case of a magnetic disk drive device with a single small-radius disk such as a micro drive, because a distance between the VCM and the magnetic head slider is small, it is possible to balance the weight between an arm portion in the VCM side on the bearing and the rest arm portion in the magnetic-head-slider side on the bearing. However, because an arm length becomes large in case of a magnetic disk drive device with larger-radius disk such as 1.8-inch or 2.5-inch disk, it is difficult to hold the impact-resistance sufficiently. Further, because the HAA has a structure balanced by the VCM, it is impossible to construct a magnetic disk drive device with a plurality of the HAAs overlapped.

In order to dissolve the above-mentioned disadvantages, the inventors are proposed to provide a balance structure formed at a front end section of the support arm.

FIG. 1 shows a side view for explaining the schematic structure of the HAA proposed by the inventors, and FIG. 2 shows a schematic diagram illustrating the movement of the balance structure of the HAA shown in FIG. 1.

In FIG. 1, reference numeral 10 denotes a support arm, 11 denotes a load beam having a balance structure in which a fulcrum is a protrusion 12 as a load support point fixed to a front end section of the support arm 10, 13 denotes a support spring coupling the load beam 11 to the support arm 10, for giving a force to the load beam 11 through the protrusion 12, 14 denotes a magnetic head slider supported by a front end section of the load beam 11 through a flexure 15, and 16 denotes a magnetic disk, respectively. In the HAA, as shown in FIG. 2, torques of an arm portion in a front side on the load support point 12 and the rest arm portion in a rear side on the load support point 12 are made equaled, which satisfies $m_1 * l_1 = m_2 * l_2$, where $m_1$ is a center of mass of the arm portion in the rear side on the load support point 12, $m_2$ is a center of mass of the rest arm portion in the front side, that is, the magnetic head slider 14 side on the load support point 12, $l_1$ is a distance between the load support point 12 and the center of mass $m_1$, and $l_2$ is a distance between the load support point 12 and the center of mass $m_2$. In other words, a center of gravity in the HAA except a holding part 17 is coincided with the load support point 12.

In the HAA with the above-mentioned structure, because the balance structure is formed at the front end section of the support arm 10 thicker than the load beam 11, a first bend-mode frequency as a characteristic frequency of the structure does not decrease in case that the support arm becomes longer differently from a case that the load beam becomes longer. Therefore, an impact-resistance of the structure does not decrease. Further, because the HAA is not a structure balanced by a coil part of the VCM, it is possible to construct a magnetic disk drive device with a plurality of the HAAs overlapped.

In the HAA having the structure shown in FIG. 1, in order to further enhance the impact-resistance, it is required to heighten the first bend-mode frequency of the load beam without increasing the load beam's weight.

Setting reinforcing parts such as ribs at both side ends of the load beam is well known in the art, and is a effective means for heightening the first bend-mode frequency without increasing the weight. Longer and higher the ribs are, higher becomes the first bend-mode frequency.

However, the ribs cannot be made longer than the whole length of the load beam, and a height limit of the ribs is imposed by need to keep clearance between the HAA and the magnetic disk. Therefore, it is seriously difficult to heighten the first bend-mode frequency in the conventional HAA. Consequently, quite difficult is to enhance the impact-resistance.

BRIEF SUMMARY OF THE INVENTION

It is therefore an object of the present invention to provide a suspension, a head support mechanism, and an HAA which have new structures capable of further enhancing an impact-resistance, and a disk drive device with the HAA.

According to the present invention, a suspension is provided, which comprises: a flexure with elasticity for supporting a head slider having at least one head element; a first load beam having first ribs for reinforcement at both side ends of the first load beam, for supporting the flexure; and a second load beam having second ribs for reinforcement at both side ends of the second load beam, at least a part of the second load beam being overlapped with the first load beam and being fixed to the first load beam, at least a part of the first and second ribs being overlapped with each other.

And also according to the present invention, a head supporting mechanism is provided, which comprises: a support arm with high rigidity; the above-mentioned suspension having a balance structure that can swing in a crossing direction to a recording medium surface on at least one load support point as a fulcrum set between the suspension and the support arm; and a load generating means generating a load for pressing a head slider through the at least one load support point in a direction to the recording medium surface. Further, according to the present invention, an HAA is provided, which comprises: the above-mentioned head supporting mechanism; and the head slider with at least one head element, fixed on the suspension of the head supporting mechanism. Furthermore, a disk drive device is provided, which comprises: at least one recording medium; and at least one above-mentioned HAA.

A load beam consists of two load beams, that is, a first load beam and a second load beam, and at least a part of the second load beam is overlapped with the first load beam and fixed to it. Further, at least a part of first ribs of the first load beam and second ribs of the second load beam are overlapped with each other. The structure where both ribs of the two load beams are partially overlapped to each other can make a first bend-mode frequency of the whole load beams increase without much increase of the total weight. The higher first bend-mode frequency causes a load fluctuation in an impact application to be reduced as well as a decrease in a period of the load fluctuation. Further, because the total weight is not increased, there is no disadvantage such that a load fluctuation amplitude becomes larger. Therefore, it is possible to drastically enhance an impact-resistance.

In the present specification, "a front end section" and "a front end" mean an end section and an end, respectively, of a side becoming free during driving, and "a rear end section" and "a rear end" mean an end section and an end, respectively, of a side opposite to the side becoming free during driving. Further, "a side end" means an end in a transverse direction to the axis.

Preferably, the first and second ribs are overlapped with each other at least at a position of the at least one load support point and/or the load generating means. Because an area around the at least one load support point and the load generating means corresponds to a node in the first bend-mode of the load beams, reinforcing arm portions in the area heightens much effectively the first bend-mode frequency.

Preferably, the first ribs are formed over the whole length of the first load beam. In the case, more preferably, the second ribs are overlapped from a rear end of the first ribs to a position of 74 percent of the whole length of the first load beam. The first bend-mode frequency is saturated when the overlap length exceeds the 74 percent. Therefore, it is preferable to set the overlap length to the 74 percent, as well as for preventing the weight increase by lengthening the ribs.

It is also preferable that the head supporting mechanism further comprises a weight means coupled to a rear end section of the suspension, for making a point of gravity in the suspension including the head slider coincide with the at least one load support point.

Preferably, the at least one load support point is at least one protrusion formed on the second load beam or the support arm.

Preferably, the load generating means is a leaf spring formed integrally with the first load beam or the second load beam, and coupled to the support arm.

It is also preferable that the head supporting mechanism further comprises a horizontally-rotating bearing means (bearing housing) for rotatably supporting the support arm and the suspension in a parallel direction with the recording medium surface.

It is also preferable that the support arm is fixed to the horizontally-rotating bearing means.

Further, the head supporting mechanism may comprise an actuator, that is, a VCM fixed to the horizontally-rotating bearing means, for rotating the support arm and the suspension in a parallel direction with the recording medium surface.

It is also preferable that the disk drive device further comprises: a plurality of recording media; a plurality of the HAA; a common horizontally-rotating bearing means for rotatably supporting the support arms and the suspensions of a plurality of the HAAs in a parallel direction with surfaces of the plurality of recording media; and an actuator, that is, a VCM fixed to the common horizontally-rotating bearing means, for rotating a plurality of the HAAs in a parallel direction with surfaces of a plurality of recording media.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 9 shows a characteristic graph illustrating a result of the simulation of a reaction force at a load point where an impact is applied; and FIG. 10 shows a perspective view illustrating a first and a second load beams in an HAA according to another embodiment of the present invention.

DETAILED DESCRIPTION OF THE INVENTION

Figure 1:
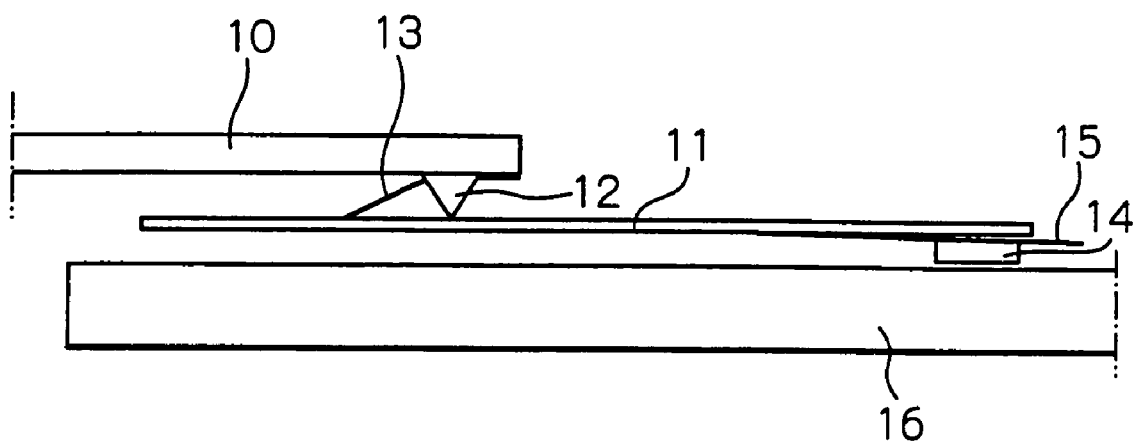
FIG. 1 shows a side view for explaining a schematic structure of an HAA proposed by the inventors.
Figure 2:
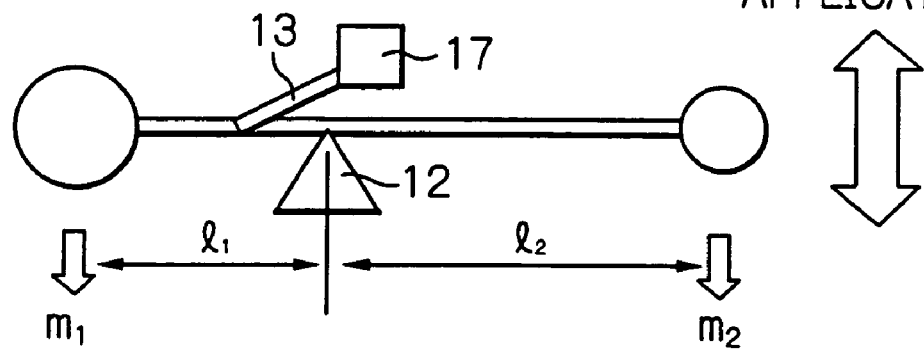
FIG. 2 shows a schematic diagram illustrating a movement of a balance structure of an HAA shown in FIG. 1.
Figure 3:
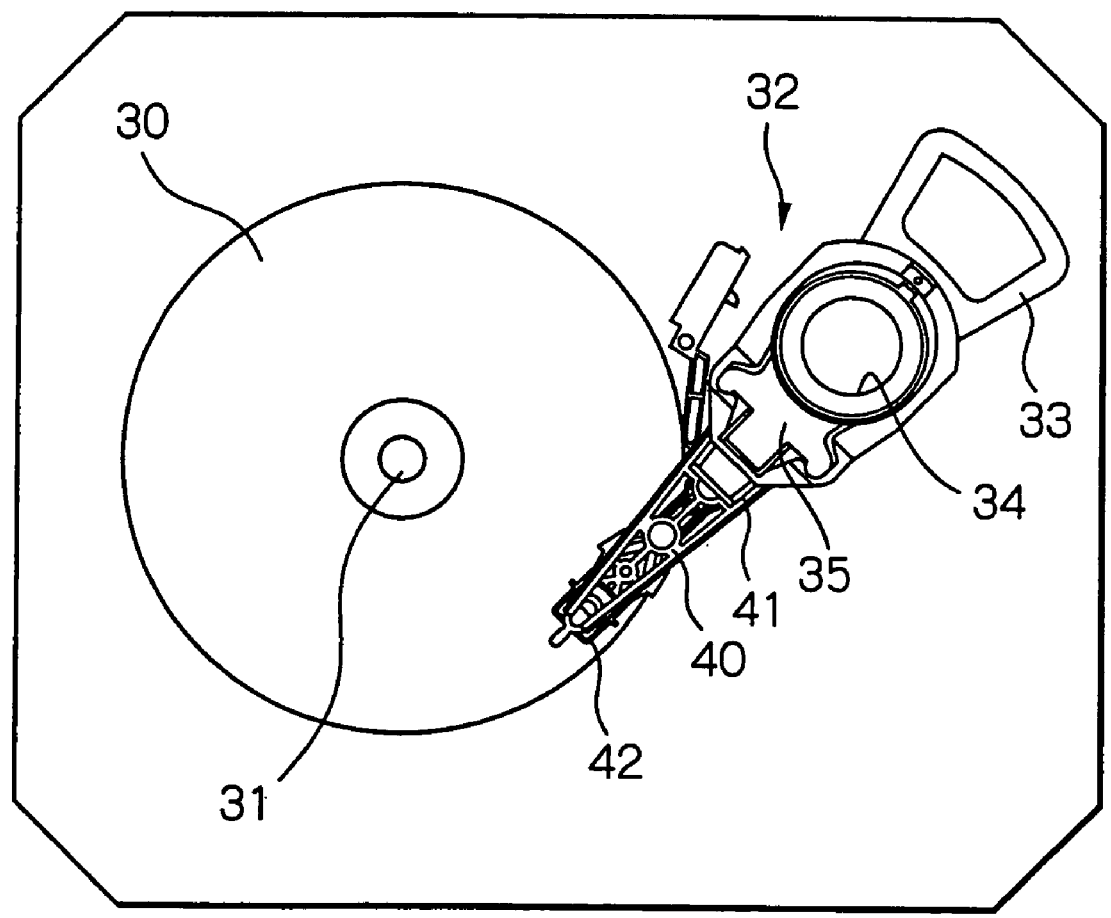
FIG. 3 shows a front view schematically illustrating a structure of a main part of a magnetic disk drive device in an embodiment of the present invention.
Figure 4:
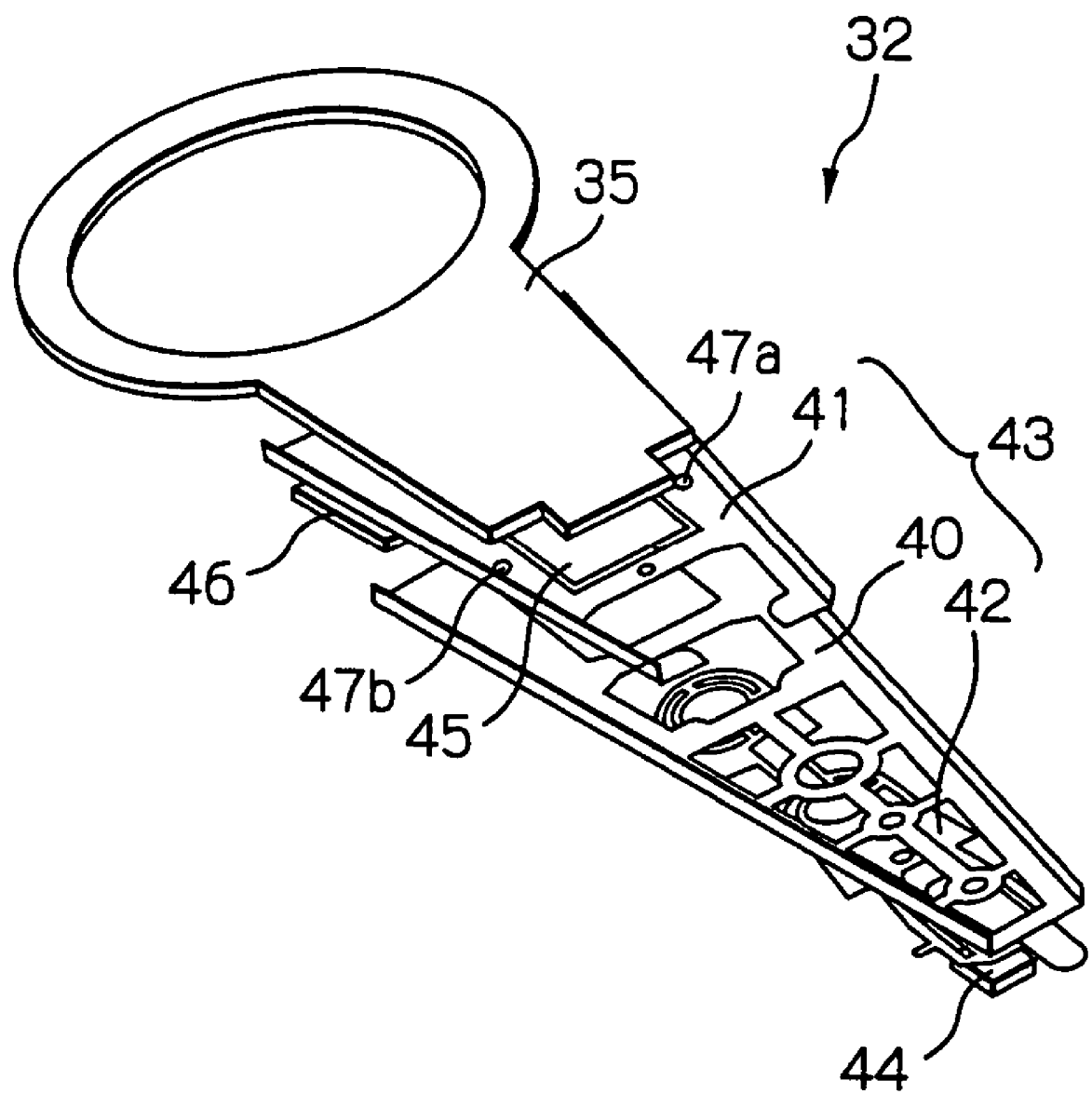
FIG. 4 shows an exploded perspective view taken from above, illustrating an HAA mounted to the magnetic disk drive device shown in FIG. 3.
Figure 5:
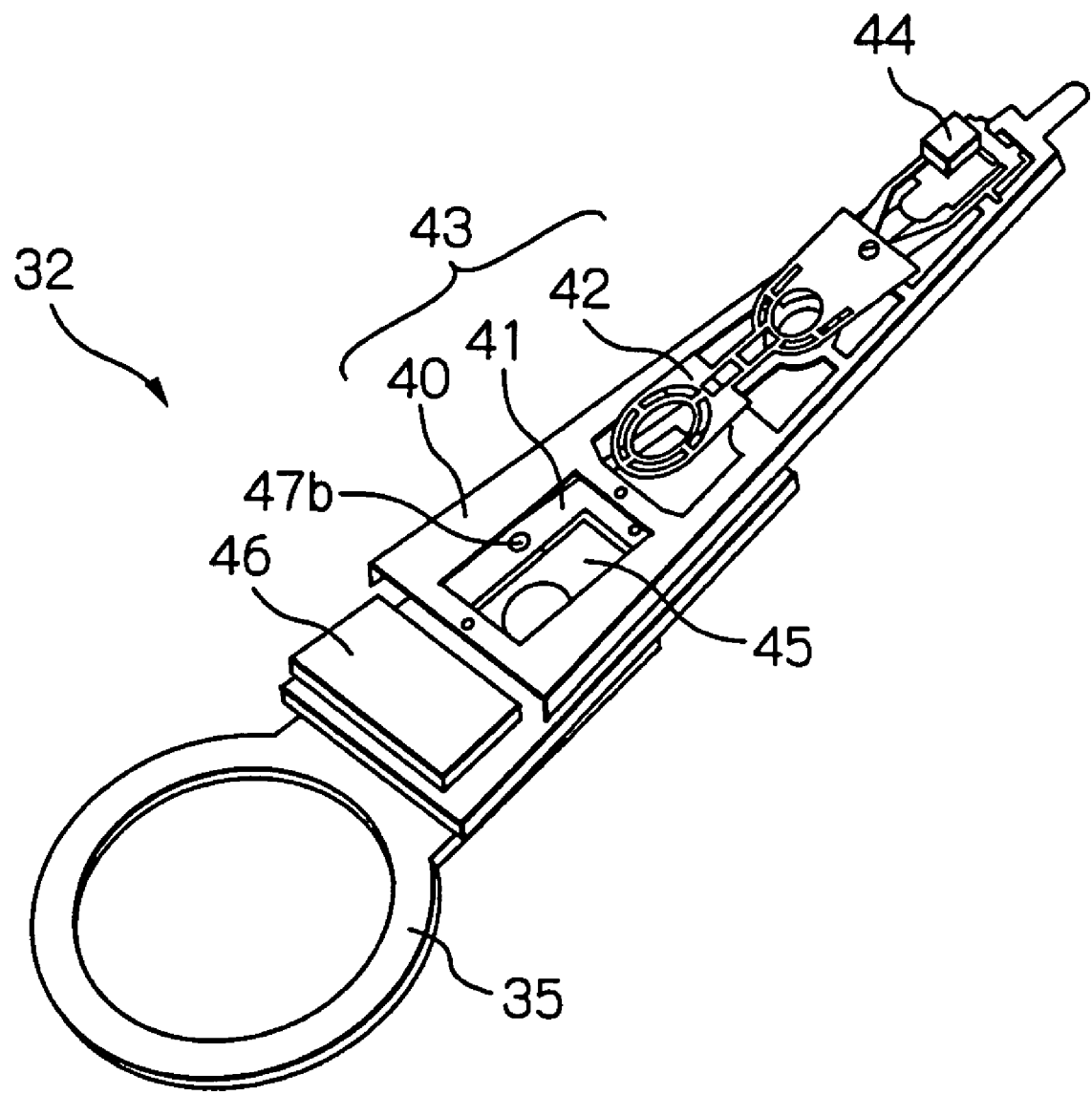
FIG. 5 shows an exploded perspective view taken from below, illustrating the HAA shown in FIG. 4.

FIG. 3 shows a front view schematically illustrating a structure of a main part of a magnetic disk drive device in an embodiment of the present invention, FIG. 4 shows an exploded perspective view illustrating an HAA mounted to the magnetic disk drive device shown in FIG. 3, taken from above (from the opposite side to a side where the magnetic head slider is fixed), FIG. 5 shows an exploded perspective view illustrating the HAA, taken from below (from the side where the magnetic head slider is fixed), and FIG. 6 shows a perspective view illustrating a first and a second load beams in the HAA. In these figures, wiring patterns are omitted to be shown.

In FIG. 3, reference numeral 30 denotes a single magnetic disk with one inch diameter, rotating around a axis 31, 32 denotes an HAA where a magnetic head slider faced to a surface of a magnetic disk 30 is fixed at a front end section of the HAA and a VCM coil part 33 is fixed at a rear end section of the HAA, and 34 denotes a bearing housing for rotating a support arm 35 of the HAA 32 in a parallel direction with a surface of the magnetic disk 30 (in a horizontal direction), respectively.

The VCM, comprising the coil part 33 and a yoke part that is not shown, causes a single HAA or a plurality of the HAAs 32 stacked in a direction of an axis of the bearing housing 34 to be rotated in the parallel direction with the surface of the magnetic disk 30. Then seeking by the magnetic head slider fixed to the front end section of the HAA is performed.

As shown in FIGS. 4 to 6, the HAA 32 comprises a support arm 35 with very high rigidity, a suspension 43 consisting mainly of two (a first and a second) load beams 40 and 41, a flexure 42 and wire members that are not shown, a magnetic head slider 44 fixed at a front end section of the suspension 43, a leaf spring 45 for generating a load, and a weight member 46 for balancing torques, fixed at a rear end section of the suspension 43.

The suspension 43, the magnetic head slider 44 and the weight member 46 constitute a balance structure that swings in a substantially orthogonal direction to the surface of the magnetic disk on the load support points 47a and 47b that are a pair of protrusions. The suspension 43 is coupled to the support arm 35 by the leaf spring 45, and becomes so-called floating state where the suspension 43 is coupled to neither the support arm 35 nor the other member except the leaf spring 45 and the pair of protrusions 47a and 47b.

The support arm 35 is formed of a member with sufficiently high rigidity, for example, a thick stainless steel plate about 150-250 μm thick.

Figure 6B:
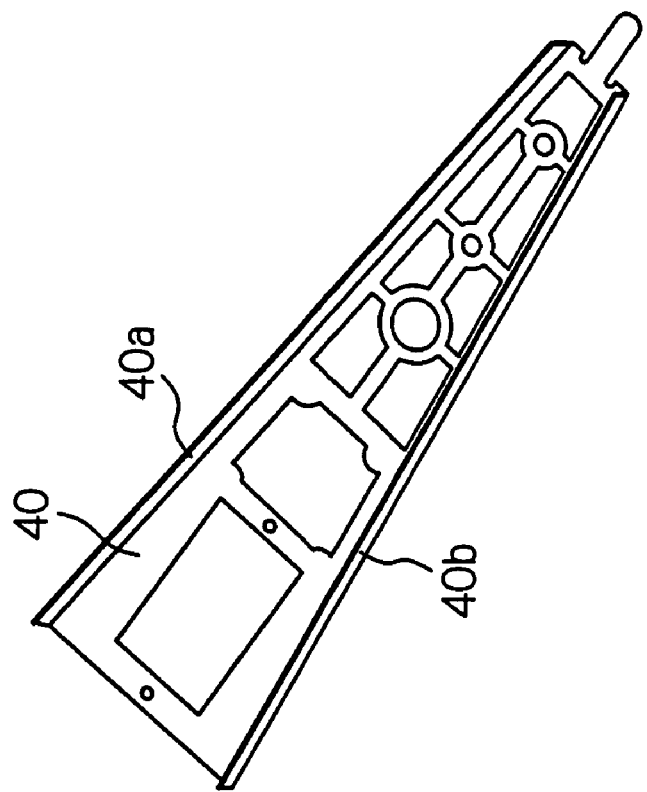
FIG. 6 shows a perspective view illustrating a first and a second load beams in the HAA shown in FIG. 4.
Figure 6A:
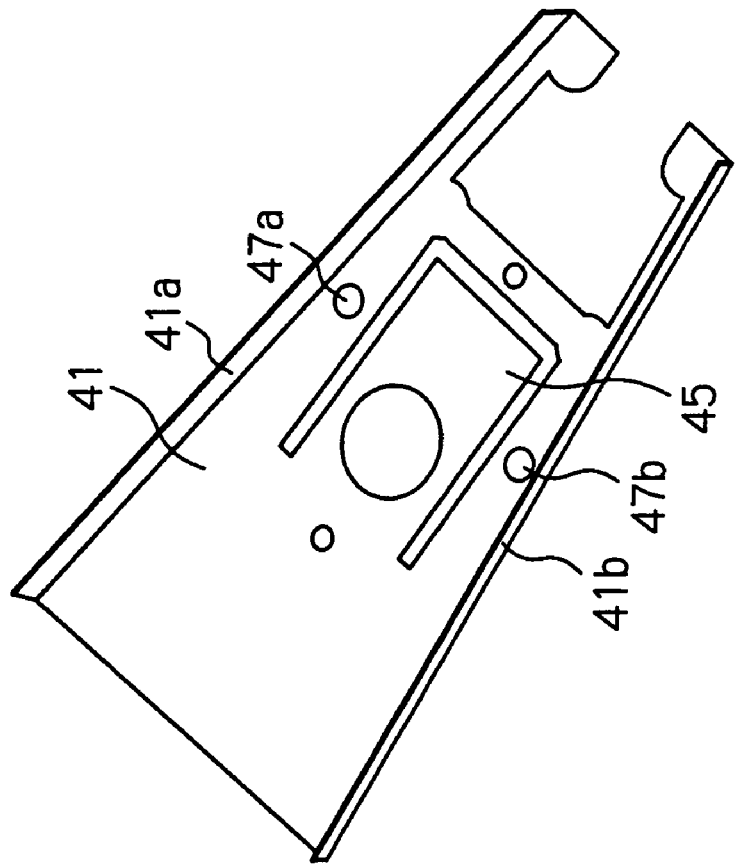

In the present embodiment, the second load beam 41 is formed of a single metal plate with higher rigidity than that of the flexure 42, for example, a stainless steel plate (for example, SUS304TA) about 30-50 μm thick, which, as shown in FIG. 6a, comprises load support points 47a and 47b as a pair of protrusions and a leaf spring 45 that are formed integrally with the second load beam 41. The second load beam 41 is coupled to the support arm 35 by fixing a free end of the leaf spring 45 to a back side of the support arm 35 with means of a laser beam welding or the like. At both side ends of the second load beam 41, ribs 41a and 41b as reinforcing parts are formed over the whole length of the second load beam 41.

In the present embodiment, the first load beam 40 is formed of a single metal plate with higher rigidity than that of the flexure 42, for example, a stainless steel plate (for example, SUS304TA) about 30-50 μm thick, which is fixed on the second load beam 41 so as to be partially overlapped with the second load beam 41 by means of a laser beam welding or the like. As shown in FIG. 6b, at both side ends of the first load beam 40, ribs 40a and 40b as reinforcing parts are also formed over the whole length of the first load beam 40.

In the present embodiment, the second load beam 41 is formed where a rear end of the second load beam 41 is extended to a neighborhood of a section of the support arm 35, fixed to the bearing housing 34, and a front end the second load beam 41 is extended across a front end of the support arm 35. The leaf spring 45 for coupling the second load beam 41 to the support arm 35 is formed integrally with the second load beam 41 at some midpoint of the second load beam 41. Specifically, the leaf spring 45 is formed either by cutting out form the identical plate member with the second load beam 41 or by welding another member to the second load beam 41. The leaf plate 45 is bended at the rear end section of the second load beam 41, and the free end of the leaf plate 45 is extended toward a front of the load beam 41.

In the present embodiment, the whole first load beam 40 is made longer than the whole second load beam 41. A rear end of the first load beam 40 is positioned at some midpoint of the second load beam 41, and the front end is extended greatly across the front end of the second load beam 41.

The flexure 42 is formed of a single metal plate with elasticity, for example, a stainless steel plate (for example, SUS304TA) about 20-30 μm thick. In a front end section of the flexure 42, a flexible tongue is formed, which supports the magnetic head slider 44 flexibly, and stabilizes its posture. In the present embodiment, almost whole the flexure 42 except a rear tail section where external connection pads of wiring member are formed or bonded, is fixed on the first load beam 40 by means of, for example, a laser beam welding.

On the flexure 42, though not shown in the figure, trace conductors, connection pads and so on used for a thin-film magnetic head element are formed as wiring members. The trace conductors, connection pads and so on may be stacked directly on the surface of the flexure, or a flexible printed circuit (FPC) formed by stacking the trace conductors on a resin layer may be bonded on the surface of the flexure 42.

In the present embodiment, on the magnetic head slider 44, a single thin-film magnetic head element constituted by a write head element and an MR read head element is formed.

The weight member 46 is bonded integrally with the second load beam 41 at a rear end section of the second load beam 41, whose position, form and weight are determined so that a center of gravity of the suspension 32 including the magnetic head slider 44 may coincide the load support points.

An important point in the present embodiment is that the load beam is constituted by two load beams, that is, the first and the second load beams 40 and 41, and some parts of the first and the second load beams 40 and 41 are overlapped and bonded to each other, further the ribs 40a and 40b of the first load beam 40 and the ribs 41a and 41b of the second load beam 41 are partially overlapped to each other. The structure where both ribs of the two load beams are partially overlapped to each other can make the first bend-mode frequency of the whole load beams increase without much increase of the total weight. The higher first bend-mode frequency causes a load fluctuation in an impact application to be reduced as well as a decrease in a period of the load fluctuation. Further, because the total weight is not increased, there is no disadvantage such that a load fluctuation amplitude becomes larger. Therefore, it is possible to drastically enhance an impact-resistance.

Furthermore, according to the present embodiment, because of the balance structure where a portion of the suspension 43 and the magnetic head slider 44 in the front side on the load support points as a fulcrum is balanced by the rest portion of the suspension 43 and the weight member 46 in the rear side on the load support points, there is no need that every HAA should be balanced with VCM. Therefore, the structure where a plurality of the HAAs overlapped to each other are driven by a single VCM is easily provided.

Figure 7:
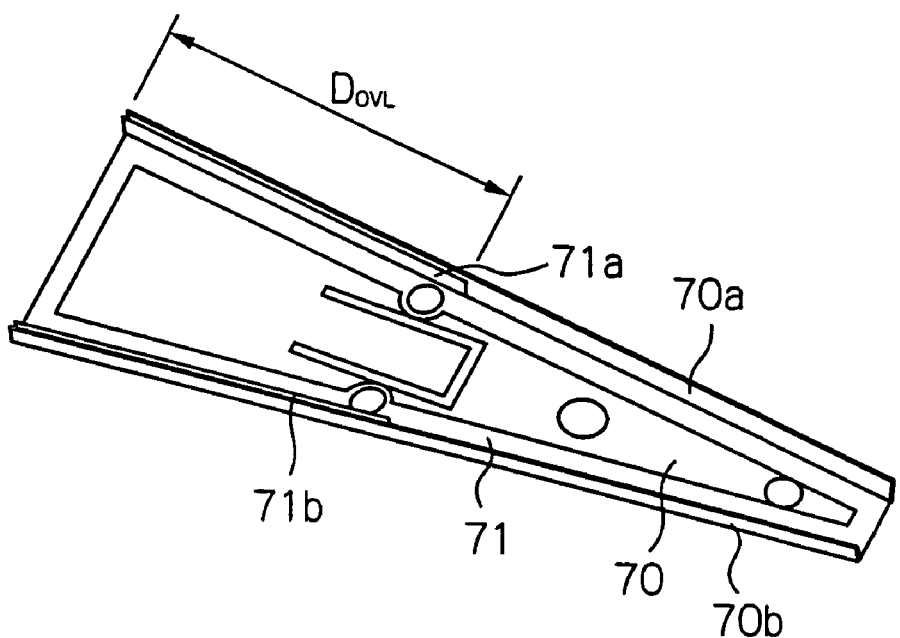
FIG. 7 shows a perspective view illustrating a structure of a simple model used for a simulation shown in FIG. 8.

Then, a simulation of a relation between an overlap length $D_{OVL}$ of the ribs in the first load beam and the ribs in the second load beam and the first bend-mode frequency is performed with use of a simple model shown in FIG. 7. In the simple model, the second load beam 71 with the same length as the first load beam 70 is overlapped over the whole length (13.5 mm) of the first load beam 70, and at both side ends of the first load beam 70, ribs 70a and 70b are formed over the whole length of the first load beam 70. The length of the ribs 71a and 71b formed at both side ends of the second load beam 71, measured from a rear end of the second load beam 71, corresponds to the overlap length $D_{OVL}$.

Figure 8:
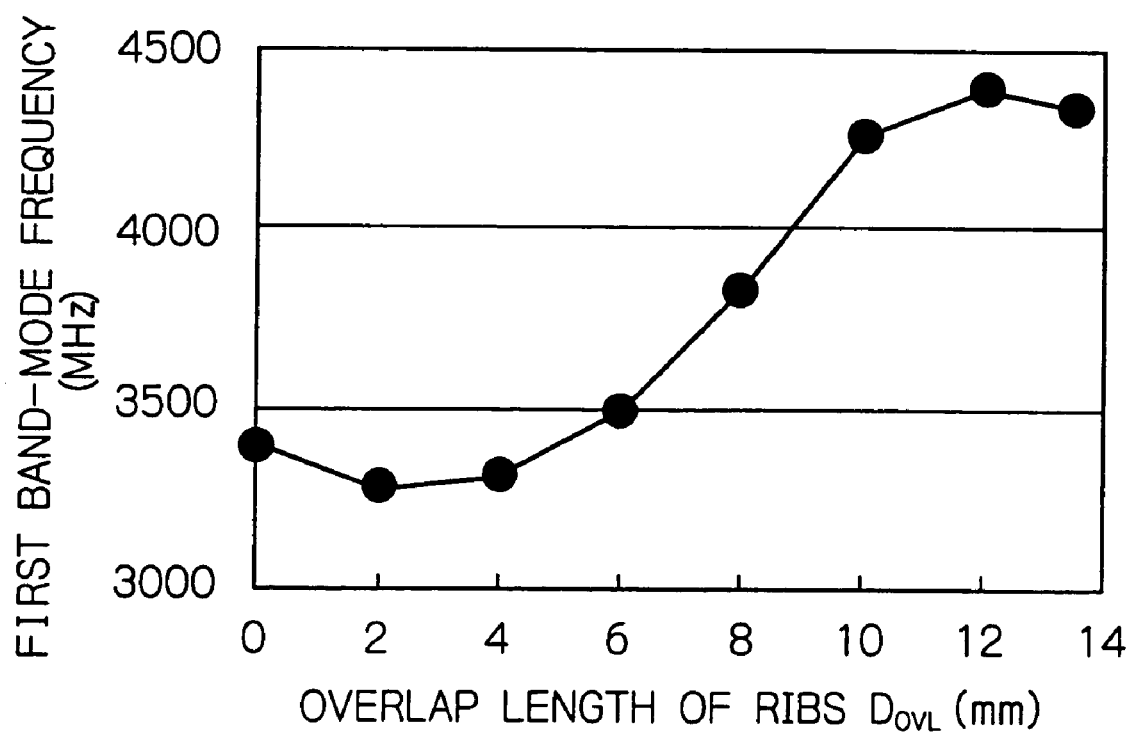
FIG. 8 shows a characteristic graph illustrating a result of the simulation of a relation between an overlap length $D_{OVL}$ of ribs and a first bend-mode frequency.

FIG. 8 shows a characteristic graph illustrating a result of the simulation. In the figure, the lateral axis of the graph indicates the overlap length $D_{OVL}$ of the ribs, and the longitudinal axis indicates the first bend-mode frequency.

As understood from the figure, the first bend-mode frequency is saturated when the overlap length $D_{OVL}$ of the ribs becomes 10 mm or more. And the increase in the overlap length $D_{OVL}$ to more than 10 mm results in only corresponding increase of the weight, which cause a load fluctuation amplitude to increase. Therefore, it is preferable to set the overlap length $D_{OVL}$ of the ribs to 10 mm, in other words, to overlap the second load beam to 74 percent of the whole length 13.5 mm of the first load beam.

Further, in the simple model, performed is a simulation of a reaction force at load points where applied is an impact of sine half-curve with a 1000G peak value, whose duration is 1.0 msec, in each case that the overlap length $D_{OVL}$ is set to 0 mm, 1.90 mm and 5.65 mm.

FIG. 9 shows a characteristic graph illustrating a result of the simulation. In the figure, the lateral axis of the graph indicates time, and the longitudinal axis indicates the reaction force at the load points.

As understood from the figure, when the first bend-mode frequency increase by making the overlap length $D_{OVL}$ longer, the load fluctuation amplitude in an impact application decreases.

FIG. 10 shows a perspective view illustrating a first and a second load beams in the HAA according to another embodiment of the present invention.

In the embodiment, the second load beam 41' comprises load support points 47a' and 47b' as a pair of protrusions, and ribs 41a' and 41b' formed over the whole length of both side ends of the second load beam 41', but not a leaf spring, while the first load beam 40' comprises a leaf spring 45' and ribs 40a' and 40b' formed over the whole length of both side ends of the first load beam 40'.

The other structures are substantially the same as the case of the embodiment shown in FIG. 3.

In the above-mentioned embodiments, the load support points consist of a pair of protrusions formed on the second load beam. However it is obvious that the load support points may be a pair of protrusions formed on the support arm, or a protrusion having a line shape instead of a pair of independent protrusions having a point shape.

Further, in the above-mentioned embodiments, a single magnetic disk and a single HAA or a plurality of the HAAs are mounted to the magnetic disk drive device. However, the magnetic disk drive device may comprise a plurality of the magnetic disks and a plurality of the HAAs. Then, a plurality of the HAAs may be set to a common bearing housing, and be rotated in a horizontal direction by a single VCM.

Furthermore, the above-mentioned embodiments relates to the HAA with the balance structure. However, an idea according to the present invention of at least partially overlapping between reinforcing parts of the first load beam and those of the second load beam is applicable to an HAA with a cantilever structure. By applying the idea to the structure, a rigidity of the suspension can be enhanced without increasing its weight.

The present invention is explained with use of the HAA and the magnetic disk drive device including the thin-film magnetic head element, but the present invention is not limited only to the HAA and the magnetic disk drive device like these, but it is obvious that the present invention is applicable to the HAA and the disk drive device including the head element such as, for example, an optical head element other than a thin-film magnetic head element.

Many widely different embodiments of the present invention may be constructed without departing from the spirit and scope of the present invention. It should be under stood that the present invention is not limited to the specific embodiments described in the specification, except as defined in the appended claims.

The invention claimed is:

1. A head supporting mechanism comprising:
    a support arm with high rigidity;
    a suspension having a balance structure that can swing in a crossing direction to a recording medium surface on at least one load support point as a fulcrum set between said suspension and said support arm; and
    a load generating means generating a load, for pressing a head slider with at least one head element through said at least one load support point in a direction to said recording medium surface,
    said suspension comprising:
    a flexure with elasticity for supporting said head slider;
    a first load beam having first ribs for reinforcement at both longitudinal side ends of said first load beam, for supporting said flexure; and
    a second load beam having second ribs for reinforcement at both longitudinal side ends of said second load beam, at least a part of said second load beam being overlapped with said first load beam and being fixed to said first load beam,
    at least a part of said first and second ribs being overlapped with each other so that bending directions of said first and second ribs are the same.

2. The head supporting mechanism as claimed in claim 1, wherein said first and second ribs are overlapped with each other at least at a position of said at least one load support point.

3. The head supporting mechanism as claimed in claim 1, wherein said first and second ribs are overlapped with each other at least at a position of said load generating means.

4. The head supporting mechanism as claimed in claim 1, wherein said first ribs are formed over the whole length of said first load beam.

5. The head supporting mechanism as claimed in claim 4, wherein said second ribs are overlapped from a rear end of said first ribs to a position of seventy four percent of said whole length of said first load beam.

6. The head supporting mechanism as claimed in claim 1, wherein said head supporting mechanism further comprises a weight means coupled to a rear end section of said suspension, for making a point of gravity in said suspension including said head slider coincide with said at least one load support point.

7. The head supporting mechanism as claimed in claim 1, wherein said at least one load support point is at least one protrusion formed on said second load beam.

8. The head supporting mechanism as claimed in claim 1, wherein said at least one load support point is at least one protrusion formed on said support arm.

9. The head supporting mechanism as claimed in claim 1, wherein said load generating means is a leaf spring formed integrally with said second load beam, and coupled to said support arm.

10. The head supporting mechanism as claimed in claim 1, wherein said load generating means is a leaf spring formed integrally with said first load beam, and coupled to said support arm.

11. The head supporting mechanism as claimed in claim 1, wherein said head supporting mechanism further comprises a horizontally-rotating bearing means for rotatably supporting said support arm and said suspension in a parallel direction with said recording medium surface.

12. The head supporting mechanism as claimed in claim 11, wherein said support arm is fixed to said horizontally-rotating bearing means.

13. The head supporting mechanism as claimed in claim 11, wherein said head supporting mechanism further comprises an actuating means fixed to said horizontally-rotating bearing means, for rotating said support arm and said suspension in a parallel direction with said recording medium surface.

14. A head arm assembly comprising:
a head supporting mechanism; and
a head slider having at least one head element,
said head supporting mechanism comprising:
a support arm with high rigidity;
a suspension having a balance structure that can swing in a crossing direction to a recording medium surface on at least one load support point as a fulcrum set between said suspension and said support arm; and
a load generating means generating a load, for pressing said head slider through said at least one load support point in a direction to said recording medium surface,
said suspension comprising:
a flexure with elasticity for supporting said head slider;
a first load beam having first ribs for reinforcement at both longitudinal side ends of said first load beam, for supporting said flexure; and
a second load beam having second ribs for reinforcement at both longitudinal side ends of said second load beam, at least a part of said second load beam being overlapped with said first load beam and being fixed to said first load beam,
at least a part of said first and second ribs being overlapped with each other so that bending directions of said first and second ribs are the same,
said head slider fixed on said suspension.

15. The head arm assembly as claimed in claim 14, wherein said first and second ribs are overlapped with each other at least at a position of said at least one load support point.

16. The head arm assembly as claimed in claim 14, wherein said first and second ribs are overlapped with each other at least at a position of said load generating means.

17. The head arm assembly as claimed in claim 14, wherein said first ribs are formed over the whole length of said first load beam.

18. The head arm assembly as claimed in claim 17, wherein said second ribs are overlapped from a rear end of said first ribs to a position of seventy four percent of said whole length of said first load beam.

19. The head arm assembly as claimed in claim 14, wherein said head supporting mechanism further comprises a weight means coupled to a rear end section of said suspension, for making a point of gravity in said suspension including said head slider coincide with said at least one load support point.

20. The head arm assembly as claimed in claim 14, wherein said at least one load support point is at least one protrusion formed on said second load beam.

21. The head arm assembly as claimed in claim 14, wherein said at least one load support point is at least one protrusion formed on said support arm.

22. The head arm assembly as claimed in claim 14, wherein said load generating means is a leaf spring formed integrally with said second load beam, and coupled to said support arm.

23. The head arm assembly as claimed in claim 14, wherein said load generating means is a leaf spring formed integrally with said first load beam, and coupled to said support arm.

24. The head arm assembly as claimed in claim 14, wherein said head supporting mechanism further comprises a horizontally-rotating bearing means for rotatably supporting said support arm and said suspension in a parallel direction with said recording medium surface.

25. The head arm assembly as claimed in claim 24, wherein said support arm is fixed to said horizontally-rotating bearing means.

26. The head arm assembly as claimed in claim 24, wherein said head supporting mechanism further comprises an actuating means fixed to said horizontally-rotating bearing means, for rotating said support arm and said suspension in a parallel direction with said recording medium surface.

27. A disk drive device comprising:
at least one recording medium; and
a head arm assembly,
said head arm assembly comprising:
a head supporting mechanism; and
a head slider having at least one head element,
said head supporting mechanism comprising:
a support arm with high rigidity;
a suspension having a balance structure that can swing in a crossing direction to a recording medium surface on at least one load support point as a fulcrum set between said suspension and said support arm; and
a load generating means generating a load, for pressing said head slider through said at least one load support point in a direction to said recording medium surface,
said suspension comprising:

a flexure with elasticity for supporting said head slider;

a first load beam having first ribs for reinforcement at both longitudinal side ends of said first load beam, for supporting said flexure; and a second load beam having second ribs for reinforcement at both longitudinal side ends of said second load beam, at least a part of said second load beam being overlapped with said first load beam and being fixed to said first load beam, at least a part of said first and second ribs being overlapped with each other so that bending directions of said first and second ribs are the same, said head slider fixed on said suspension.

28. A disk drive device as claimed in claim 27, wherein said disk drive device further compromise:

a plurality of recording media;

a plurality of said head arm assemblies;

a common horizontally-rotating bearing means for rotatably supporting said support arm and said suspensions of said plurality of said head arm assemblies in a parallel direction with surface of said plurality of recording media; and an actuating means fixed to said common horizontally-rotating bearing means, for rotating said plurality of said head arm assemblies in a parallel direction with surfaces of said plurality of recording media.

* * * * *